US010769690B2

(12) United States Patent
Ogawa (10) Patent No.: US 10,769,690 B2
(45) Date of Patent: Sep. 8, 2020

(54) REGISTER SYSTEM CONFIGURED TO COMMUNICATE WITH WIRELESS COMMUNICATION DEVICES TO AUTHENTICATE USER ATTRIBUTES

(71) Applicant: TOSHIBA TEC KABUSHIKI KAISHA, Tokyo (JP)

(72) Inventor: Yuichi Ogawa, Izunokuni Shizuoka (JP)

(73) Assignee: TOSHIBA TEC KABUSHIKI KAISHA, Tokyo (JP)

( * ) Notice: Subject to any disclaimer, the term of this patent is extended or adjusted under 35 U.S.C. 154(b) by 720 days.

(21) Appl. No.: 15/370,097

(22) Filed: Dec. 6, 2016

(65) Prior Publication Data

US 2017/0186059 A1  Jun. 29, 2017

(30) Foreign Application Priority Data

Dec. 28, 2015 (JP) .................. 2015-255688

(51) Int. Cl.
*G06Q 30/06* (2012.01)
*G06Q 20/42* (2012.01)
(Continued)

(52) U.S. Cl.
CPC ....... *G06Q 30/0607* (2013.01); *G06Q 20/208* (2013.01); *G06Q 20/209* (2013.01); *G06Q 20/3278* (2013.01); *G06Q 20/42* (2013.01)

(58) Field of Classification Search
CPC .............. G06Q 20/208; G06Q 20/209; G06Q 20/3278; G06Q 30/0607; G06Q 20/42; G06Q 30/06
(Continued)

(56) References Cited

U.S. PATENT DOCUMENTS 6,512,919 B2 * 1/2003 Ogasawara .......... G06Q 20/208
186/61
6,877,032 B1 * 4/2005 Philyaw ............. G06K 7/10762
709/217
(Continued)

FOREIGN PATENT DOCUMENTS

JP     2008257429 A    9/1997
JP     H09-251579 A    9/1997
(Continued)

OTHER PUBLICATIONS

Espacenet machine translation of: Japan 2003132430 (A)—May 9, 2003, Inventor: Sugita Nouhiro.*
(Continued)

*Primary Examiner* — Andrew Joseph Rudy
(74) *Attorney, Agent, or Firm* — Kim & Stewart LLP (57) ABSTRACT

A register system includes an optical code reader, a data storage, a wireless communication interface through which the register system communicates wirelessly with a user computing device, a display, and a processor. The processor queries a master record stored in the data storage to determine whether or not a product corresponding to a product code read by the code reader is an confirmation-required product, and responsive to determining that the product is an confirmation-required product, controls the wireless communication interface to transmit a pull request for a user attribute stored in the user computing device. The processor further determines whether or not product registration processing for the confirmation-required product should continue with or without special processing based on the user attribute received by the wireless communication interface from the user computing device responsive to the pull request.

20 Claims, 9 Drawing Sheets

(51) Int. Cl.
*G06Q 20/20* (2012.01)
*G06Q 20/32* (2012.01)

(58) Field of Classification Search
USPC ............ 705/23; 235/379–383; 709/217–223
See application file for complete search history.

(56) References Cited

U.S. PATENT DOCUMENTS

| | | | |
|---|---|---|---|
| 7,097,098 B2* | 8/2006 | Roberts | G06Q 20/208 235/383 |
| 8,321,914 B2* | 11/2012 | Dattathreya | G06Q 10/087 726/4 |
| 8,477,082 B2* | 7/2013 | Lee | G06F 9/445 345/2.1 |
| 9,165,174 B2* | 10/2015 | Huck | G06K 7/109 |
| 9,449,290 B1* | 9/2016 | Cavanaugh | G06Q 30/02 |
| 9,471,862 B2* | 10/2016 | Atkinson | G06K 19/06028 |
| 9,892,663 B2* | 2/2018 | Atkinson | G09F 3/0297 |
| 9,924,389 B2* | 3/2018 | Siomina | H04B 1/7083 |
| 10,044,781 B2* | 8/2018 | Healy | H04L 65/60 |

FOREIGN PATENT DOCUMENTS

| | | |
|---|---|---|
| JP | 2003-132430 A | 5/2003 |
| JP | 2010050208 | 3/2010 |
| JP | 2011258803 | 12/2011 |
| JP | 2013003866 A | 1/2013 |

OTHER PUBLICATIONS

Japanese Notice of Reasons for Refusal dated Oct. 1, 2019, filed in corresponding Japanese Patent Application No. 2015-255688, 8 pages (with Translation).

* cited by examiner

EXAMPLE OF SCREEN DISPLAYED ON CASHIER DISPLAY

FIG. 7B

EXAMPLE OF SCREEN DISPLAYED ON CUSTOMER DISPLAY

REGISTER SYSTEM CONFIGURED TO COMMUNICATE WITH WIRELESS COMMUNICATION DEVICES TO AUTHENTICATE USER ATTRIBUTES

CROSS-REFERENCE TO RELATED APPLICATION

This application is based upon and claims the benefit of priority from Japanese Patent Application No. 2015-255688, filed Dec. 28, 2015, the entire contents of which are incorporated herein by reference.

FIELD

Embodiments described herein relate generally to a resister system, such as a merchandise sales data processing apparatus, that is configured to establish wireless communication with user devices to authenticate attributes of the users, such as age.

BACKGROUND

A technology that estimates an age of a customer by recognizing a face image of the customer is known. However, it is difficult to accurately estimate the age of customer from the face image. Therefore, it is difficult to automatically perform checkout of age-restricted merchandise (alcoholic beverages and cigarettes) based on the face image. Alternatively, a cashier may subjectively estimate a customer class (age, sex, ethnicity, and the like) of the customer. However, it is still difficult to accurately estimate the customer class.

DETAILED DESCRIPTION

An exemplary embodiment provides a merchandise sales data processing apparatus which specifies attribute information of a customer in a way different from a face image of the customer or subjective estimation of a cashier and perform information processing in accordance with the specified attribute information with respect to the customer.

In general, according to an embodiment, a register system includes an optical code reader, a data storage, a wireless communication interface through which the register system communicates wirelessly with a user computing device, a display, and a processor. The processor queries a master record stored in the data storage to determine whether or not a product corresponding to a product code read by the code reader is an confirmation-required product, and responsive to determining that the product is an confirmation-required product, controls the wireless communication interface to transmit a pull request for a user attribute stored in the user computing device. The processor further determines whether or not product registration processing for the confirmation-required product should continue with or without special processing based on the user attribute received by the wireless communication interface from the user computing device responsive to the pull request.

A merchandise sales data processing apparatus according to embodiments will be described with reference to the drawings. The scope of the present disclosure is not limited to the embodiments.

First Embodiment

Figure 1:
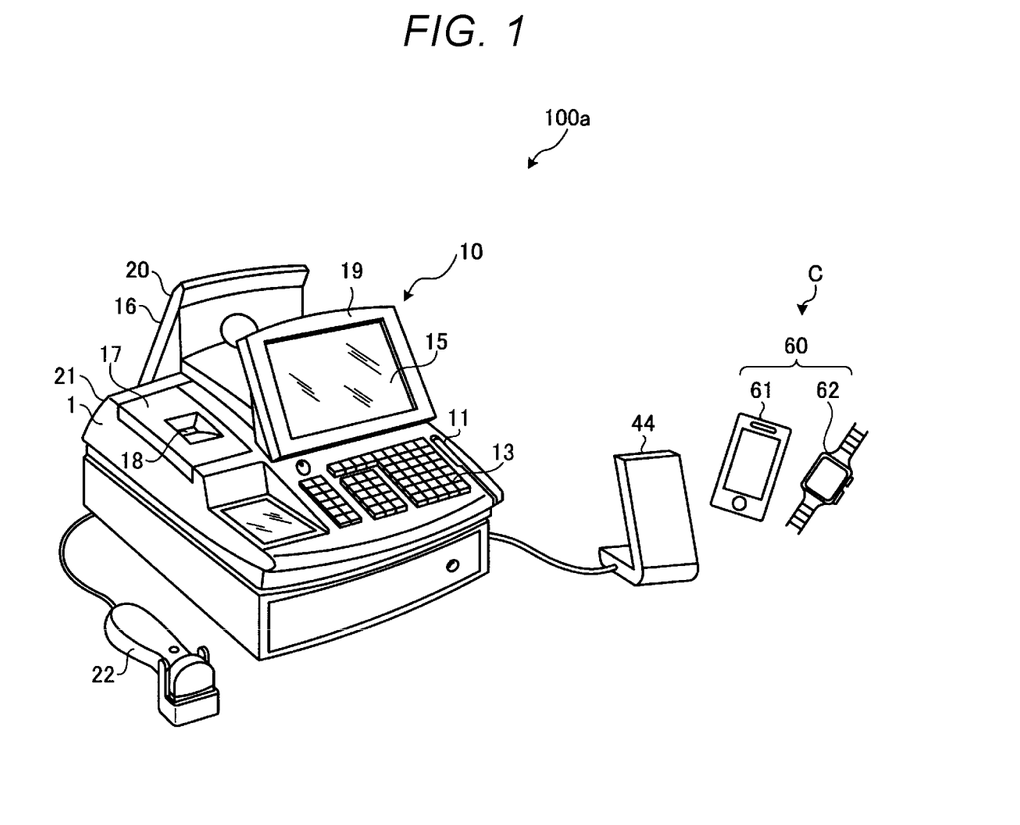
FIG. 1 is a perspective view of a merchandise sales data processing apparatus according to a first embodiment.

FIG. 1 is a perspective view of a merchandise sales data processing apparatus 100a according to a first embodiment.

As illustrated in FIG. 1, the merchandise sales data processing apparatus 100a includes a point of sales (POS) terminal 10 and a near field communication (NFC) reader 44 as a unit that performs wireless communication between the POS terminal 10 and a portable terminal 60 carried by a customer C who purchases merchandise. The unit that performs the wireless communication is not limited to the NFC reader. That is, the POS terminal 10 and the portable terminal 60 may also be connected by a wireless communication unit such as Wi-Fi®, Bluetooth®, and the like.

For example, a smartphone 61 or a wristwatch-type terminal 62 is used as the portable terminal 60. It is preferable that the portable terminal 60 is a wearable device. That is, the portable terminal 60 may be an eyeglass-type terminal or a wristband-type terminal.

The portable terminal 60 functions as a device that stores a date of birth, an age, or the like as the attribute information of the customer C. Accordingly, when a checkout is performed at the time of purchasing merchandise, if the customer C approaches within a predetermined distance (for example, within 1 m) from the NFC reader 44, the NFC reader 44 reads the date of birth from the portable terminal 60 of the customer C in a non-contact manner, and inputs the read date to the POS terminal 10. The device that stores the attribute information is not limited to the portable terminal 60. That is, the attribute information of the customer C may also be stored in various cards carried by the customer C such as a driver's license, an insurance card, a commuter pass, a credit card, and an employee ID card of the customer C. In addition, it is preferable that reading of the attribute information from the device that stores the attribute information is performed in a non-contact manner. However, it is not limited to the non-contact manner. That is, the attribute information may also be read when the device that stores the attribute information contacts a reading unit that is communicable while being touched, instead of the NFC reader 44. Alternatively, the attribute information may also be read by connecting the reading unit and the device that stores the attribute information using a cable, instead of the NFC reader 44.

A main body 1 of the POS terminal 10, which is a case of the POS terminal 10, includes a card slit 11 for performing a checkout process by a card such as a credit card and the like and a keyboard 13 such as a numeric keypad, a department key, a subtotal key, a deposit and current total key, a receipt issuance key, a clearing key, and the like. The POS terminal main body 1 further includes a cashier display 15, a customer display 16, and a printer (receipt printer) 17 that discharges a receipt from a receipt issuing port 18 after printing sales information on an elongated shape receipt paper.

Each of the cashier display 15 and the customer display 16 is configured with, for example, a liquid crystal display. A cashier touch panel 19 and a customer touch panel 20 are provided on a surface of the cashier display 15 and the customer display 16, respectively. When a cashier touches a region of an object (switch) displayed on the cashier display 15, the cashier touch panel 19 transmits a signal according to the touched object to a CPU 31 (FIG. 2) of the POS terminal 10. When a cashier touches a region of an object (switch) displayed on the customer display 16, the customer touch panel 20 transmits a signal in accordance with the touched object to the CPU 31.

A speaker 21 is provided in a customer side of the POS terminal 10. The speaker 21 outputs message voice. Furthermore, the POS terminal 10 includes a bar code reader (optical code reader) 22. The bar code reader 22 reads merchandise information included in a bar code attached to the merchandise purchased by the customer C, and transmits the read merchandise information to the CPU 31.

The NFC reader 44 is connected to the POS terminal 10, and performs communication between the portable terminal 60 and the POS terminal 10.

Next, a hardware configuration of the POS terminal 10 will be described with reference to FIG. 2. In addition, a hardware configuration of the portable terminal 60 (the device that stores the attribute information) will be described with reference to FIG. 3.

Figure 2:
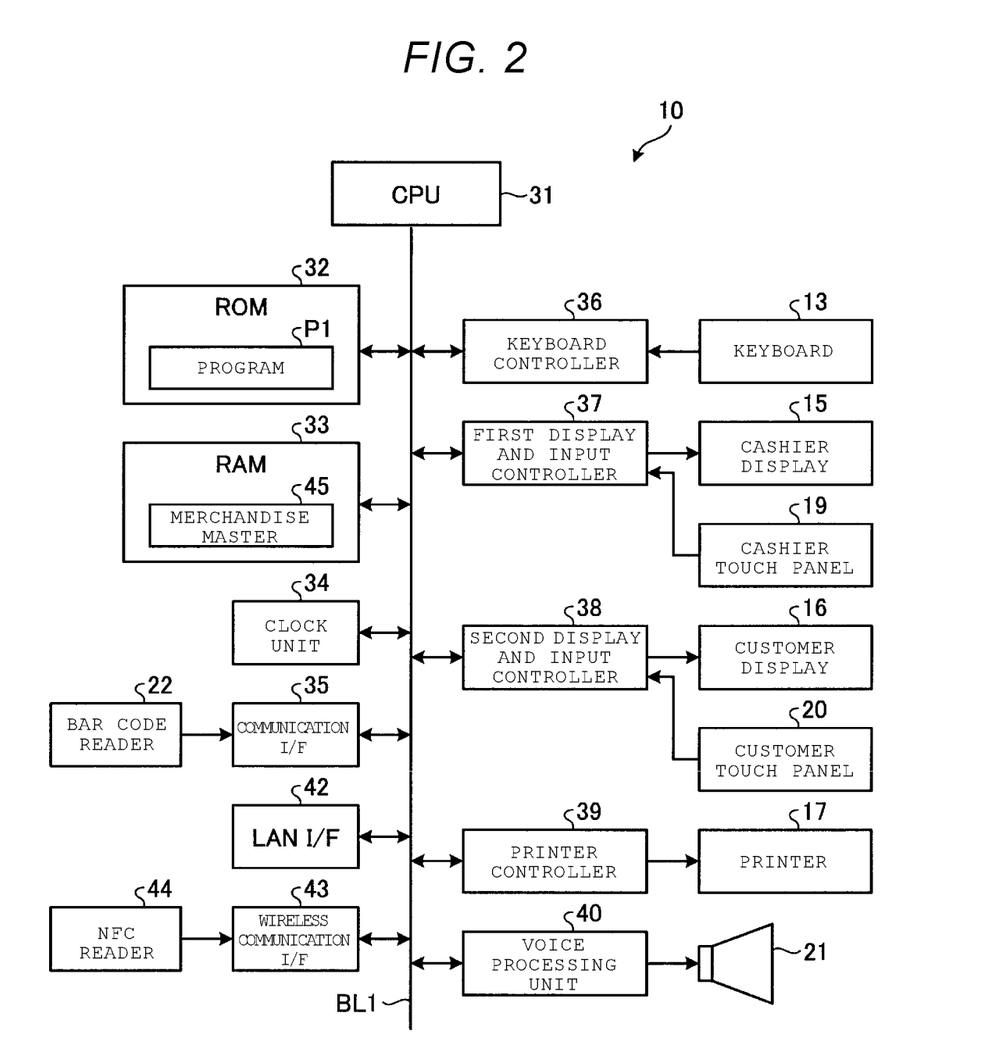
FIG. 2 is a block diagram of a POS terminal included in the merchandise sales data processing apparatus.

FIG. 2 is a block diagram of the POS terminal 10. The POS terminal 10 includes the central processing unit (CPU) 31 that performs various arithmetic processes and controls each unit. The CPU 31 is connected to a read only memory (ROM) 32, a random access memory (RAM) 33, and a clock unit 34, through a bus line BL1. The ROM 32 stores fixed data such as a program P1 for controlling an operation of the POS terminal 10 and the like. The RAM (data storage) 33 includes a memory region for storing a merchandise master record 45 (details will be described below) in which detail information of merchandise sold at a store is stored, or a memory region for temporally storing sales data. The RAM 33 is used as a work area when the CPU 31 performs an arithmetic process. The clock unit 34 tells a date and time. That is, the POS terminal 10 has a configuration of a general computer system in which the CPU 31 becomes a control subject, and reads and executes the program P1.

In addition, the POS terminal 10 includes a communication interface (I/F) 35 connected to the bar code reader 22, a wireless communication I/F 43 connected to the NFC reader 44, and a keyboard controller 36 connected to the keyboard 13, as an information input and output device.

Further, the POS terminal 10 includes a first display and input controller 37 connected to the cashier display 15 and the cashier touch panel 19, and a second display and input controller 38 connected to the customer display 16 and the customer touch panel 20 as an input and output device.

Furthermore, the POS terminal 10 includes a printer controller 39 connected to the printer 17, a voice processing unit 40 connected to the speaker 21, and a local area network (LAN) I/F 42 that connects the POS terminal 10 to other computers or a connection device, as an input and output device.

These input and output devices included in the POS terminal 10 control an operation by the CPU 31, by being connected to the CPU 31 through the entirety of the bus lines BL1.

Figure 3:
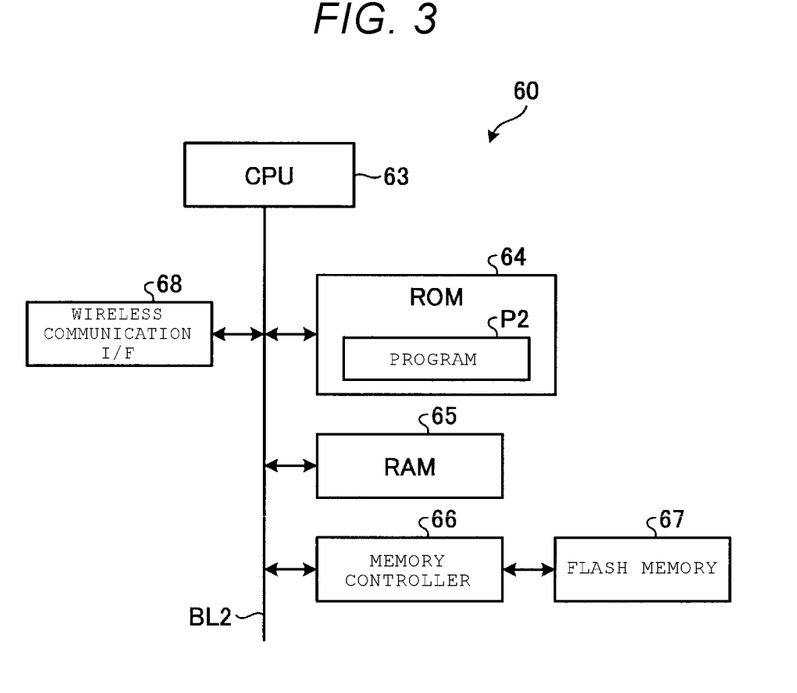
FIG. 3 is a block diagram of a portable terminal.

FIG. 3 is a block diagram of the portable terminal 60. The portable terminal 60 includes a CPU 63 that controls each unit of the portable terminal 60 by performing various arithmetic processes. The CPU 63 is connected to a ROM 64 for storing the fixed data of a program P2 or the like for controlling an operation of the portable terminal 60 and a RAM 65 used as a work area for storing variable data to be writable, through a bus line BL2. That is, the portable terminal 60 has a configuration of a general computer system in which the CPU 63 becomes a control subject, and reads and executes the program P2.

In addition, the portable terminal 60 includes a memory controller 66 connected to a flash memory 67 and a wireless communication I/F 68, as an information input and output device. These input and output devices are connected to the CPU 63 through the bus line BL2, and an operation thereof is controlled by the CPU 63.

The flash memory 67 stores the date of birth or an age as the attribute information of the customer C. The wireless communication I/F 68 is an interface at the time of performing the wireless communication between the portable terminal 60 and the NFC reader 44 connected to the POS terminal 10.

Figure 4:
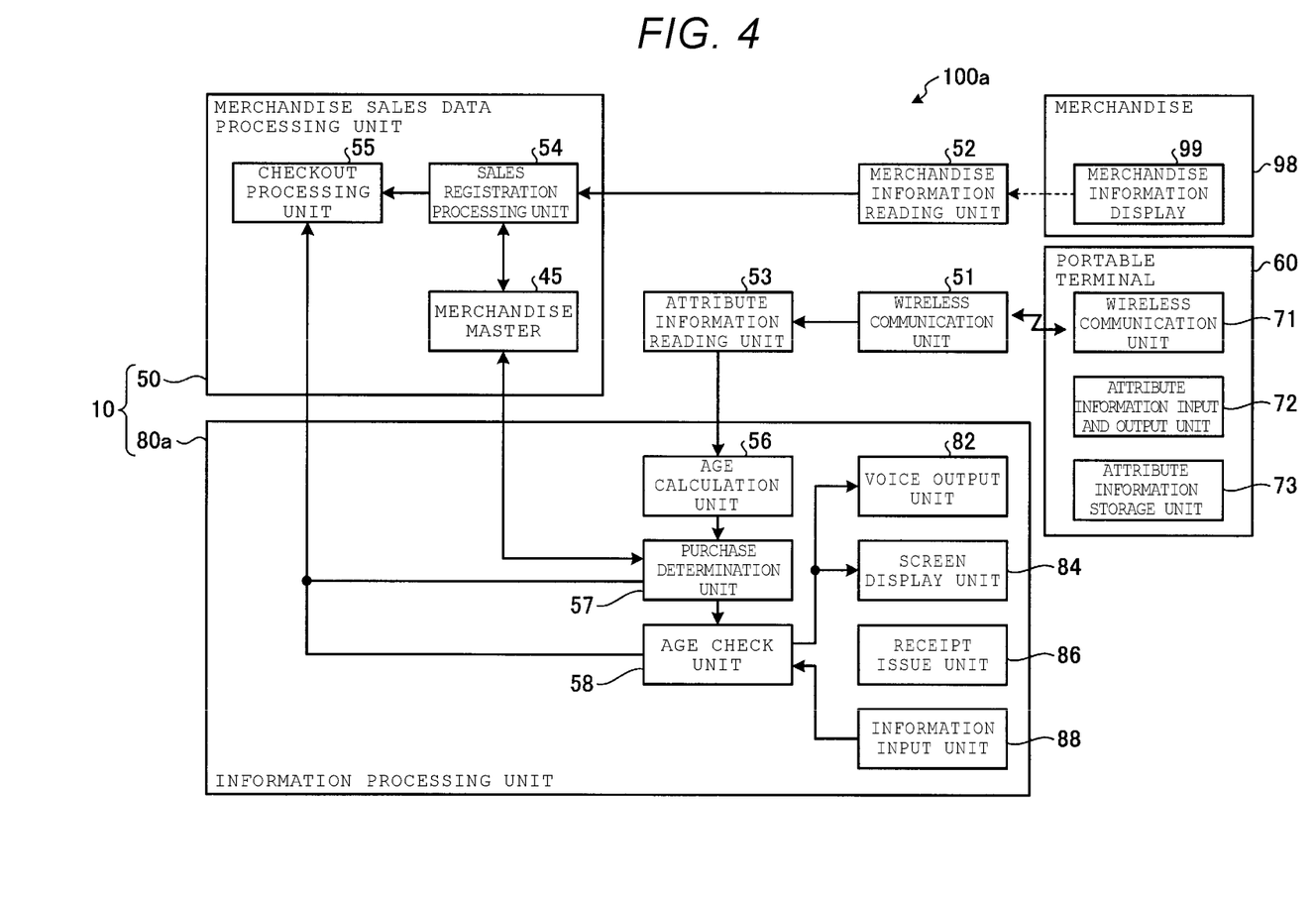
FIG. 4 is a block diagram of the merchandise sales data processing apparatus.

The CPU 31 of the POS terminal 10 operates a wireless communication unit 51, an attribute information reading unit 53, a merchandise information reading unit 52, a merchandise sales data processing unit 50, and an information processing unit 80a, as a functional unit, in a block diagram illustrating a functional configuration of the merchandise sales data processing apparatus 100a illustrated in FIG. 4, by operating the CPU 31 in accordance with the program P1.

In addition, the CPU 63 of the portable terminal 60 operates a wireless communication unit 71, an attribute information input and output unit 72, and an attribute information storage unit 73, as a functional unit, in a block diagram illustrating a functional configuration of the merchandise sales data processing apparatus 100a illustrated in FIG. 4, by operating the CPU 63 in accordance with the program P2.

The merchandise sales data processing unit 50 of the POS terminal 10 includes the CPU 31, the ROM 32, the RAM 33, the keyboard 13, the cashier display 15, the cashier touch panel 19, the bar code reader 22, the clock unit 34, and the NFC reader 44 (FIG. 2), described above, and performs a sales registration process described below and the checkout process when the customer C purchases merchandise 98.

The information processing unit 80a of the POS terminal 10 presents information required for the checkout to the customer C. In addition, the information processing unit 80a receives information input by the customer C. The CPU 31 controls the customer display 16, the customer touch panel 20, the speaker 21, and the printer 17 (FIG. 2) through each controller such that the information processing unit 80a is operated.

The wireless communication unit 71 of the portable terminal 60 performs wireless communication with the wireless communication unit 51. Then, the attribute information of the customer C stored in the portable terminal 60 is transmitted to the merchandise sales data processing unit 50. The CPU 63 controls the wireless communication I/F 68 (FIG. 3) such that the wireless communication unit 71 is operated.

The attribute information input and output unit 72 of the portable terminal 60 reads the attribute information of the customer C from the attribute information storage unit 73. In addition, the attribute information input and output unit 72 writes and stores the attribute information input by the customer C in the attribute information storage unit 73. The CPU 63 controls the ROM 64, the RAM 65, and the memory controller 66 (FIG. 3) such that the attribute information input and output unit 72 is operated.

The attribute information storage unit 73 of the portable terminal 60 includes the flash memory 67 (FIG. 3) described above. In the present embodiment, the attribute information storage unit 73 stores the date of birth of the customer C. However, the attribute information stored in the attribute information storage unit 73 is not limited to the date of birth, and may also store an age, sex, ethnicity, a merchandise purchase history, and the like of the customer C.

The merchandise 98 includes a merchandise information display portion 99 that illustrates a merchandise code. The merchandise information display portion 99 is configured by a bar code attached to the merchandise 98.

Figure 5:
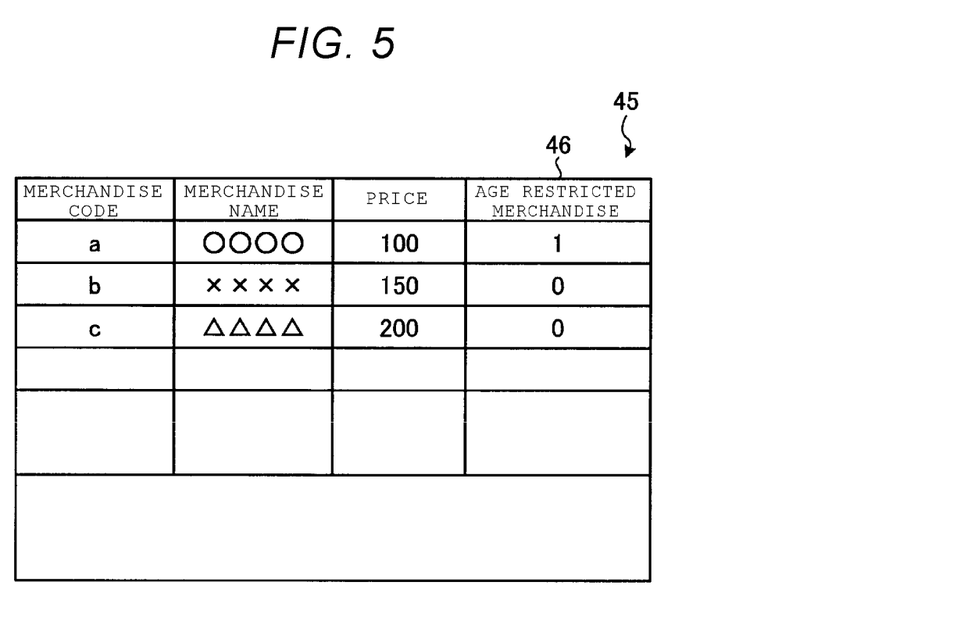
FIG. 5 is a table illustrating an example of information registered in a merchandise master record.

The merchandise code displayed on the merchandise information display portion 99 is uniquely associated with the merchandise master record 45 illustrated in FIG. 5. The merchandise master record 45 stores a merchandise code, a merchandise name, a merchandise price, and a flag indicating whether or not merchandise is age restricted merchandise, for each merchandise. The flag indicating whether or not merchandise is age restricted merchandise is registered (i.e., an age requirement is set for the merchandise) in an age restricted merchandise area 46. In FIG. 5, the flag of merchandise of the merchandise code a is set as "1". This indicates that the merchandise of the merchandise code a is the age restricted merchandise (for example, cigarette or alcoholic beverages), and it is not permitted to sell the merchandise of the merchandise code a to the customer C under a predetermined age. Meanwhile, the flag of the merchandise of a merchandise code b and the merchandise code c is set as "0", and this indicates that these merchandises are not the age restricted merchandise. As a specific permissible age for purchase, an age prescribed by law or the like for each country (or jurisdiction) is stored in the ROM 32 (FIG. 2) of the POS terminal 10.

Next, with reference to FIG. 4, a specific function of each functional block of the merchandise sales data processing apparatus 100a will be described. As illustrated in FIG. 4, the merchandise sales data processing unit 50 of the POS terminal 10 includes the merchandise master record 45, a sales registration processing unit 54, and a checkout processing unit 55.

The sales registration processing unit 54 performs the sales registration process of reading information such as the name, price, and the like of merchandise from the merchandise master record 45 (FIG. 5), displaying the information on the cashier display 15 and the customer display 16 (FIG. 1), and storing the information in the RAM 33 (FIG. 2) according to the merchandise code read from the bar code.

The checkout processing unit 55 performs the checkout process of performing payment by cash, a prepaid card, a credit card, or the like, displaying the total amount or changes on the cashier display 15 and the customer display 16, and issuing a receipt on which the merchandise information or the checkout information is printed by using the printer 17 (FIG. 1), based on the merchandise information on which the sales registration processing is performed.

In addition, the wireless communication unit 51 performs the wireless communication with the portable terminal 60. Accordingly, the date of birth that is the attribute information of customer C is read from the portable terminal 60. The merchandise information reading unit 52 reads the bar code attached to the merchandise 98 which is carried to the cashier by the customer C, and recognizes the merchandise code (read process of merchandise information). The attribute information reading unit 53 reads the date of birth of the customer C from the portable terminal 60 (attribute information storing unit) in the non-contact manner.

The information processing unit 80a of the POS terminal includes an age calculation unit 56, a purchase determination unit 57, an age check unit 58, a voice output unit 82, a screen display unit 84, a receipt issue unit 86, and an information input unit 88.

The age calculation unit 56 calculates the current age of customer C based on the date of birth of the customer C read by the attribute information reading unit 53. When the attribute information reading unit 53 reads the date of birth of the customer C, if the merchandise information reading unit 52 performs a read process on the merchandise information, the age calculation unit 56 reads the current date from the clock unit 34 of the POS terminal 10. Then, the age calculation unit 56 calculates the current age of customer C by subtracting the date of birth of the customer C from the read current date. The age of customer C may be stored in the portable terminal 60, and the attribute information reading unit 53 may read the age. At this time, the age calculation unit 56 processes the age read by the attribute information reading unit 53 as the current age of the customer C.

The purchase determination unit 57 determines whether or not the merchandise 98 is the age restricted merchandise, based on the information of the merchandise master record 45 corresponding to the merchandise code read by the merchandise information reading unit 52. When the merchandise 98 is the age restricted merchandise, the current age of the customer C calculated by the age calculation unit 56 and the permissible age for purchasing the merchandise 98 are compared. Accordingly, when the current age of customer C is under the permissible age for purchasing the merchandise 98, it is determined that the customer C is not permitted to purchase the merchandise 98. Meanwhile, when the current age of the customer C is equal or over the permissible age for purchasing the merchandise 98, or the merchandise 98 is not the age restricted merchandise, it is determined that the purchase of the merchandise 98 is acceptable.

When the purchase determination unit 57 determines whether the age of customer C is under the permissible age for purchasing the merchandise 98, the age check unit 58 performs check on an age of the customer C (performs an information process).

When notification by voice is required for the customer C, the voice output unit 82 outputs voice information from the speaker 21. When notification by screen display is required for the customer C, the screen display unit 84 displays visual information (text information or image information) on the customer display 16.

The receipt issue unit 86 issues a receipt indicating that the checkout completed. The issued receipt may also be output from the printer 17 as a paper receipt, and may also be issued as an electronic receipt. When the electronic receipt is issued, the receipt issue unit 86 transmits the issued electronic receipt to the portable terminal 60 of the customer C. The information input unit 88 receives information required for the age check or the like from the customer touch panel 20 of the customer C.

Figure 6:
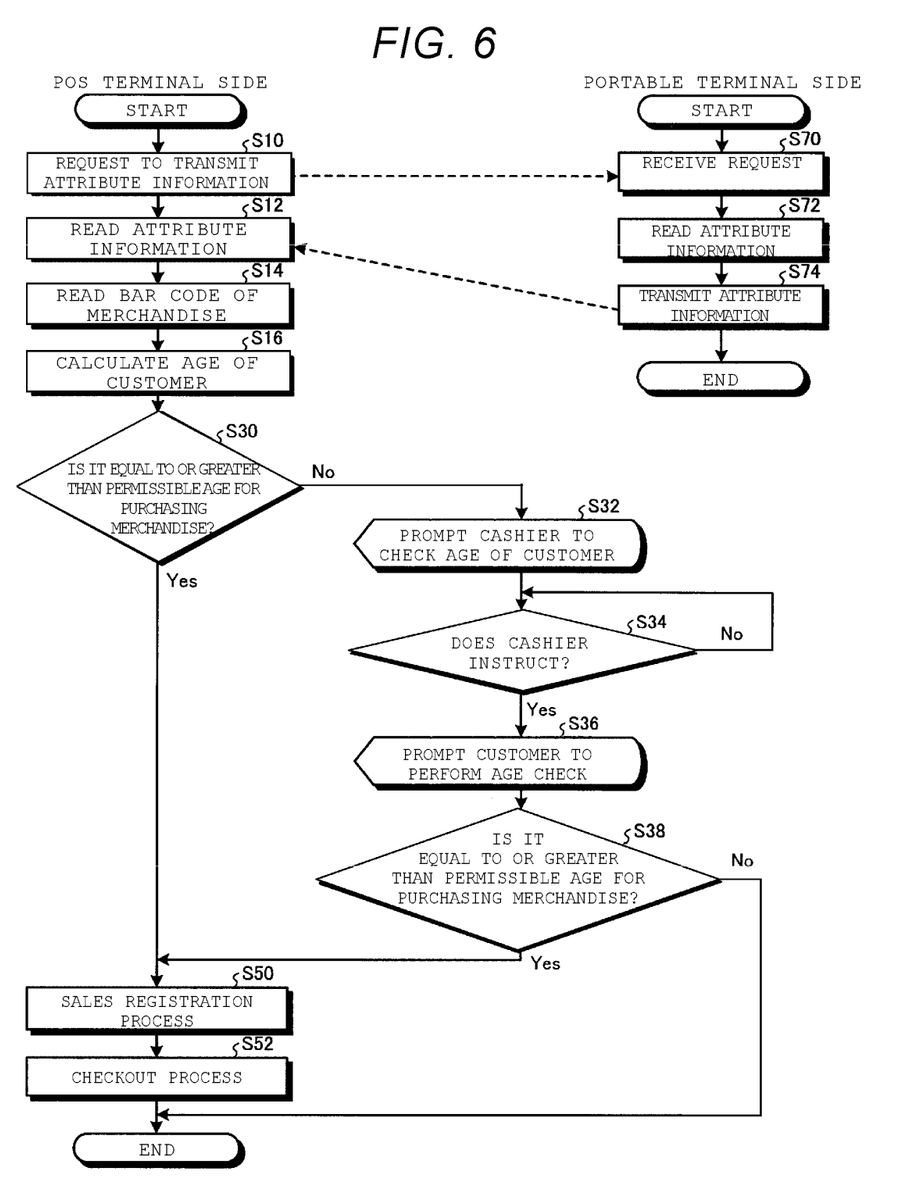
FIG. 6 is a flowchart illustrating a flow of a process performed by the merchandise sales data processing apparatus.
Figure 7A:
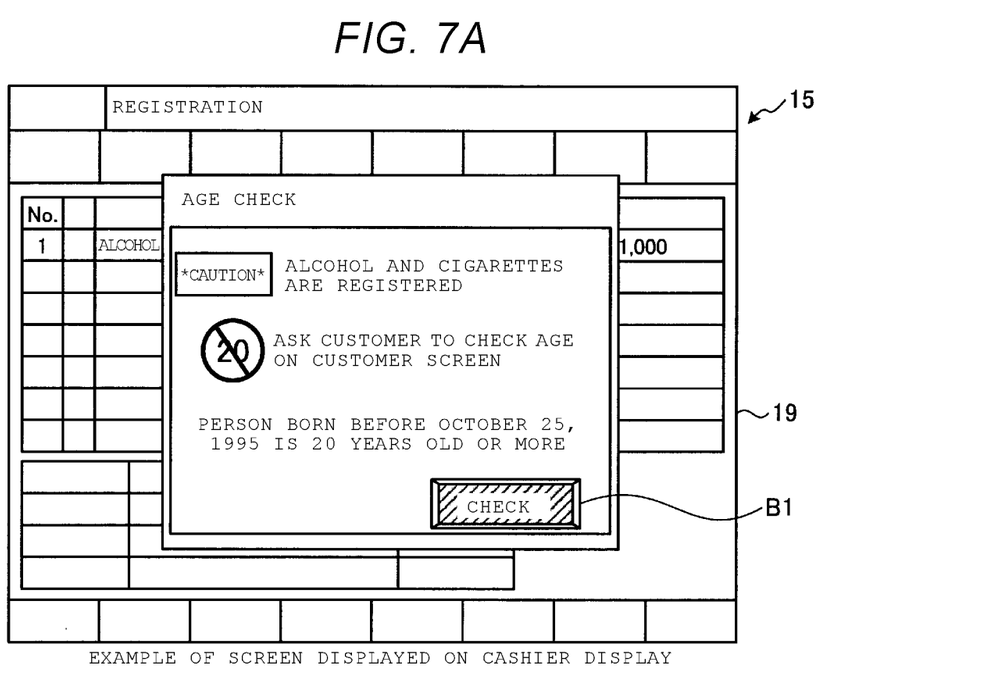
FIG. 7A illustrates an example of a screen displayed on a cashier display.
Figure 7B:
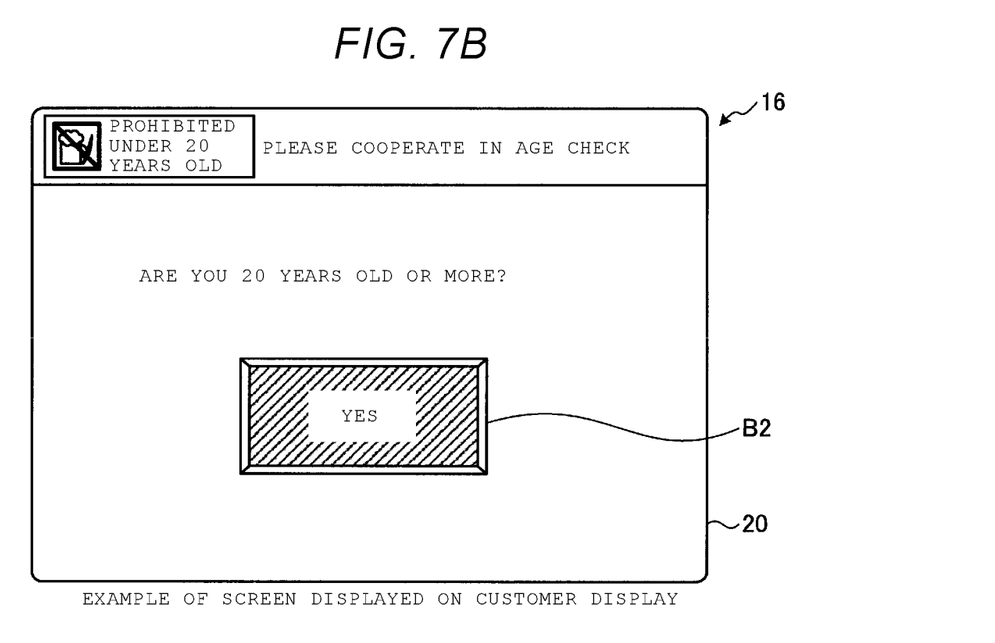
FIG. 7B illustrates an example of a screen displayed on a customer display.

Next, with reference to FIG. 6 and FIG. 7, an operation of the merchandise sales data processing apparatus 100a assuming a customer P who was born Sep. 20, 1996 and a customer Q who was born Oct. 20, 1986 purchase alcoholic beverages (merchandise 98) on behalf of the customer C will be described. Further, it is assumed that the minimum permissible age for purchasing the alcoholic beverages is 20 years old and the current date is Oct. 25, 2015. The date of birth of the customer P (Q) is registered in the portable terminal 60.

The POS terminal 10 requests transmission of the attribute information (date of birth) (i.e., sends a pull request for the attribute information) with respect to the portable terminal 60 (for example, wristwatch-type terminal 62) (S10).

The portable terminal 60 receives the request from the POS terminal 10 (S70). Then, the portable terminal 60 reads the attribute information (date of birth) of the customer P (Q) stored in the attribute information storage unit 73 (S72). Furthermore, the portable terminal 60 transmits the read attribute information to the POS terminal 10 (S74), and terminates the process of the portable terminal 60.

The attribute information reading unit 53 of the POS terminal 10 reads the attribute information of the customer P (Q) transmitted from the portable terminal 60 (S12). The cashier reads the bar code (merchandise information display portion 99) of alcoholic beverages that is the merchandise 98 with the bar code reader 22 (S14). Then, the merchandise sales data processing unit 50 recognizes that the purchased merchandise is the age restricted merchandise. In addition, at this time, the age calculation unit 56 reads the current date from the clock unit 34 (FIG. 2).

The age calculation unit 56 calculates an age of the customer P (Q) from the date of birth of the customer P (Q) read by the attribute information reading unit 53 and the current date read from the clock unit 34 (S16). In the present embodiment, the age calculation unit 56 calculates that the age of the customer P is 19 years old. In addition, the age calculation unit 56 calculates that an age of the customer Q is 29 years old.

The purchase determination unit 57 determines whether or not the age of customer P (Q) calculated by the age calculation unit 56 is equal to or greater than the permissible age for purchasing the merchandise 98 (S30). When age of the customer Q is equal to or greater than the permissible age for purchase (S30; Yes), the process proceeds to S50. Otherwise (S30; No), the process proceeds to S32. When the purchase determination unit 57 determines that the customer P is under the permissible age for purchase, the process proceeds to S32. Meanwhile, when the purchase determination unit 57 determines that the customer Q reaches the permissible age for purchase, the process proceeds to S50.

The age check unit 58 determines that it is necessary to check the age of customer P, and prompts the cashier to perform the check of the age of customer P (S32). At this time, the age check unit 58 displays a screen (prompt) illustrated in FIG. 7A on the cashier display 15.

The age check unit 58 detects whether the cashier instructs to perform the age check through the cashier touch panel 19 (S34). That is, the age check unit 58 detects if the cashier selects an object B1 (FIG. 7A). When the cashier selects the object B1, that is, when it is prompted to perform the age check (S34; Yes), the process proceeds to S36. Otherwise (S34; No), the process repeats S34.

The age check unit 58 prompts the customer P to perform the age check (S36). At this time, the age check unit 58 displays an object B2 (FIG. 7B) for checking that the age of customer P is equal to or greater than the permissible age for purchase on the customer display 16 (customer touch panel 20), and outputs a message such as "please check age" and the like from the speaker 21 (voice output unit 82) so as to prompt the check of the age of customer P.

The age check unit 58 checks if the customer P declares that he/she is equal to or greater than the permissible age for purchase (S38). When the customer P declares that he/she is equal to or greater than the permissible age for purchase (S38; Yes), the process proceeds to S50. Otherwise (S38; No), it is determined that it is not permitted to sell to the customer P, and the process of FIG. 6 is terminated.

The sales registration processing unit 54 performs the sales registration process (S50). In a case of the customer Q, the S50 is performed subsequent to S30. Accordingly, the checkout processing unit 55 performs the checkout process after terminating the sales registration process on the entirety of merchandise (S52). After that, by performing a process (not illustrated in FIG. 6) such as transmission of sales information to a headquarter and the like according to necessity, the process of a POS terminal 10 side is terminated.

As described above, according to the merchandise sales data processing apparatus 100a of the first embodiment, the attribute information reading unit 53 reads the date of birth of the customer C from the portable terminal 60 (attribute information storing unit) which is held by the customer C and which stores the date of birth (attribute information) of the customer C (P and Q). In addition, the merchandise information reading unit 52 performs a read process of reading merchandise information including the permissible age for purchasing the merchandise 98. Then, when the merchandise information reading unit 52 performs the read process and the merchandise sales data processing unit 50 performs the sales registration process and the checkout process, the information processing unit 80a performs the check of the age of customer C (information process) in accordance with a relationship between the current age and the permissible age for purchasing the merchandise 98 calculated from the date of birth of the customer C. Since a special operation for the age check is not performed with respect to the customer Q who reaches the permissible age for purchase, in convenience of the customer Q can be minimized. In addition, according to the merchandise sales data processing apparatus 100a, since the date of birth of the customer C can be read without contacting the customer C, there is no need to require the customer C to perform another operation.

In addition, according to the merchandise sales data processing apparatus 100a of the first embodiment, the merchandise information reading unit 52 reads the permissible age for purchasing the merchandise 98 that is purchased by the customer C (P and Q). In addition, the age calculation unit 56 calculates the current age of the customer C based on the date of birth of the customer C and a date in which the read process is performed on the merchandise information of the merchandise 98. Then, the age check unit 58 performs the age check with respect to only the customer P who is determined to be under the permissible age for purchasing the merchandise 98. Since it is not necessary to perform the age check with respect to the customers C, it is possible to more efficiently perform the checkout process at the time of purchasing the age restricted merchandise. When the attribute information reading unit 53 reads the age of customer, since the age calculation unit 56 determines that the read age is the age of customer C, and performs the age check with respect to only the customer P under the permissible age for purchasing the merchandise 98, the same advantage can be obtained.

Furthermore, since the CPU 31 of the POS terminal 10 of the first embodiment executes the program P1 including a step S12 for reading the date of birth from the portable terminal 60 (attribute information storing unit) which is held by the customer C and which stores the date of birth of the customer C (attribute information), the step S14 of performing the read process of reading the merchandise information of the merchandise 98 purchased by the customer C, the step S50 of performing the sales registration process of registering sales of the merchandise 98 based on the merchandise information, the step S52 of performing the checkout process of performing the checkout related to the sales registration process, and the steps S30 to S38 of performing the age check (information processing) in accordance with the date of birth at the time of performing the read process, the sales registration process, and the checkout process, it is possible to perform the check of the age of customer C without requiring the customer C to perform another operation.

Second Embodiment

Next, a second embodiment will be described. The same portion as the above-described first embodiment will be illustrated by the same reference numeral and description thereof will be omitted. The second embodiment is different from the first embodiment in that a function of accumulating the merchandise purchase history of the customer C in other terminals connected to the POS terminal 10 or the POS terminal 10 and a function of issuing a coupon (reward) to a customer C of a birth month are applied thereto.

Figure 8:
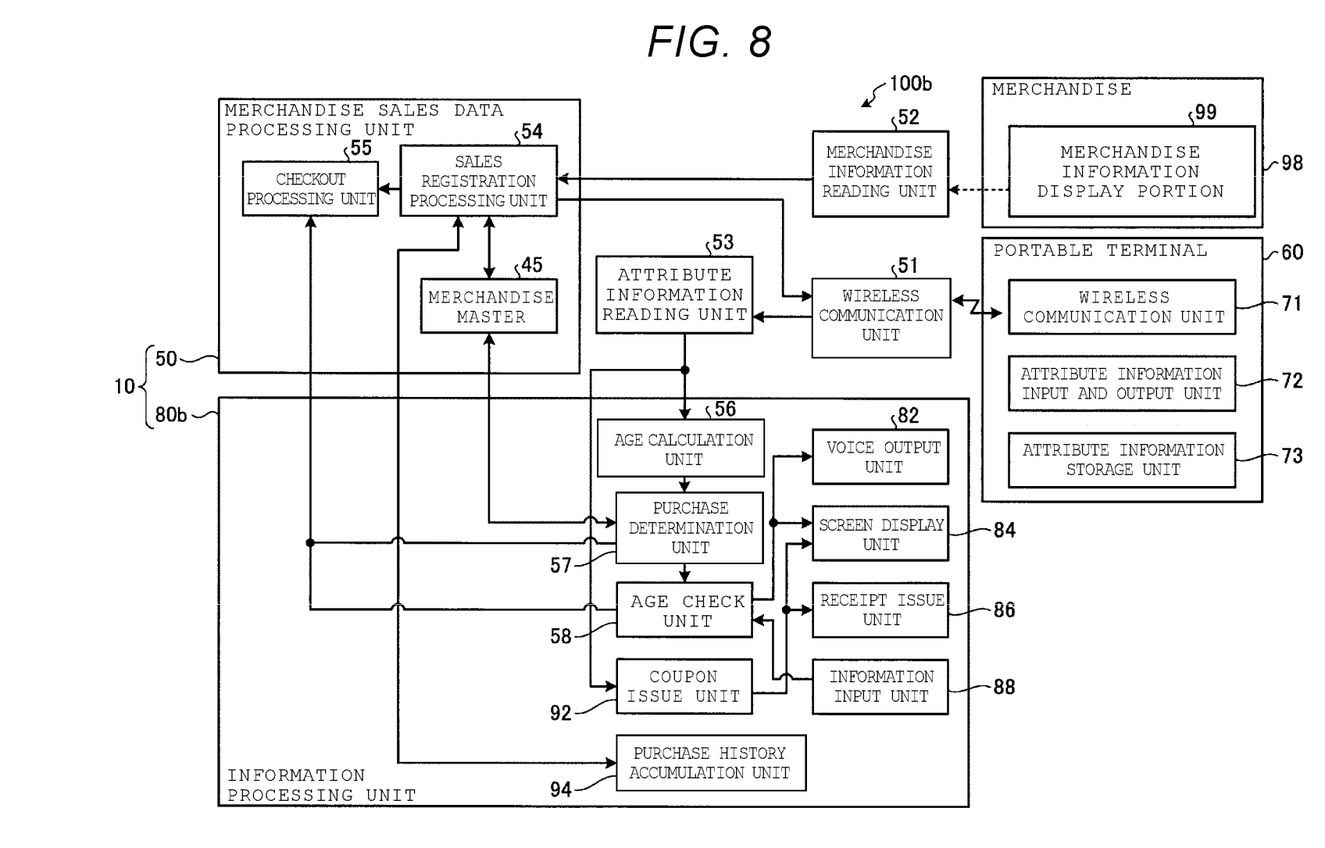
FIG. 8 is a block diagram of a merchandise sales data processing apparatus according to a second embodiment.

FIG. 8 is a block diagram of a merchandise sales data processing apparatus 100*b* according to the second embodiment. The merchandise sales data processing apparatus 100*b* includes an information processing unit 80*b* instead of the information processing unit 80*a* included in the merchandise sales data processing apparatus 100*a*. The information processing unit 80*b* includes a coupon issue unit 92 and a purchase history accumulation unit 94, in addition to components of the information processing unit 80*a*.

In the merchandise sales data processing apparatus 100*b*, the coupon issue unit 92 checks whether or not a date in which the checkout process of the merchandise 98 is performed is included in the birth month of the customer C. When the date is included in the birth month, a coupon (reward) that can be used at the next merchandise purchase is issued. The coupon may be output by being printed on a paper receipt by the printer 17 (FIG. 2) and may be transmitted to the portable terminal 60 of the customer C by being output as the electronic receipt from the receipt issue unit 86.

In addition to the issue of the coupon in the birth month of the customer C, when purchasing specific merchandise equal to or greater than a predetermined number of times within a certain period, the coupon issue unit 92 can provide rewards if a set condition is satisfied as a coupon available in series store is issued, or the like.

The purchase history accumulation unit 94 stores the purchase history of the current shopping when the checkout processing unit 55 terminates the checkout process of the merchandise 98. Since the POS terminal 10 placed in a store is connected to other computers through the LAN I/F 42 (FIG. 2), the store can manage the merchandise purchase history accumulated in a plurality of the POS terminals 10 for each of the customer C, or for each of the merchandise. Accordingly, by using the accumulated purchase history, it is possible to perform an appropriate after-sales service with respect to the customer C. In addition, since customer class information indicating whether a certain merchandise is purchased by any customer class is obtained, it is possible to utilize the customer class information in the sales strategy of the store such as expansion of assortment and the like. In order to be valid customer class information, it is preferable to also accumulate sex of the customer C along with the date of birth (age class), as the attribute information of the customer C. That is, the attribute information reading unit 53 reads the sex along with the date of birth of the customer C, and the purchase history accumulation unit 94 accumulates the read date of birth and sex in conjunction with the purchase history as the customer class information.

Figure 9:
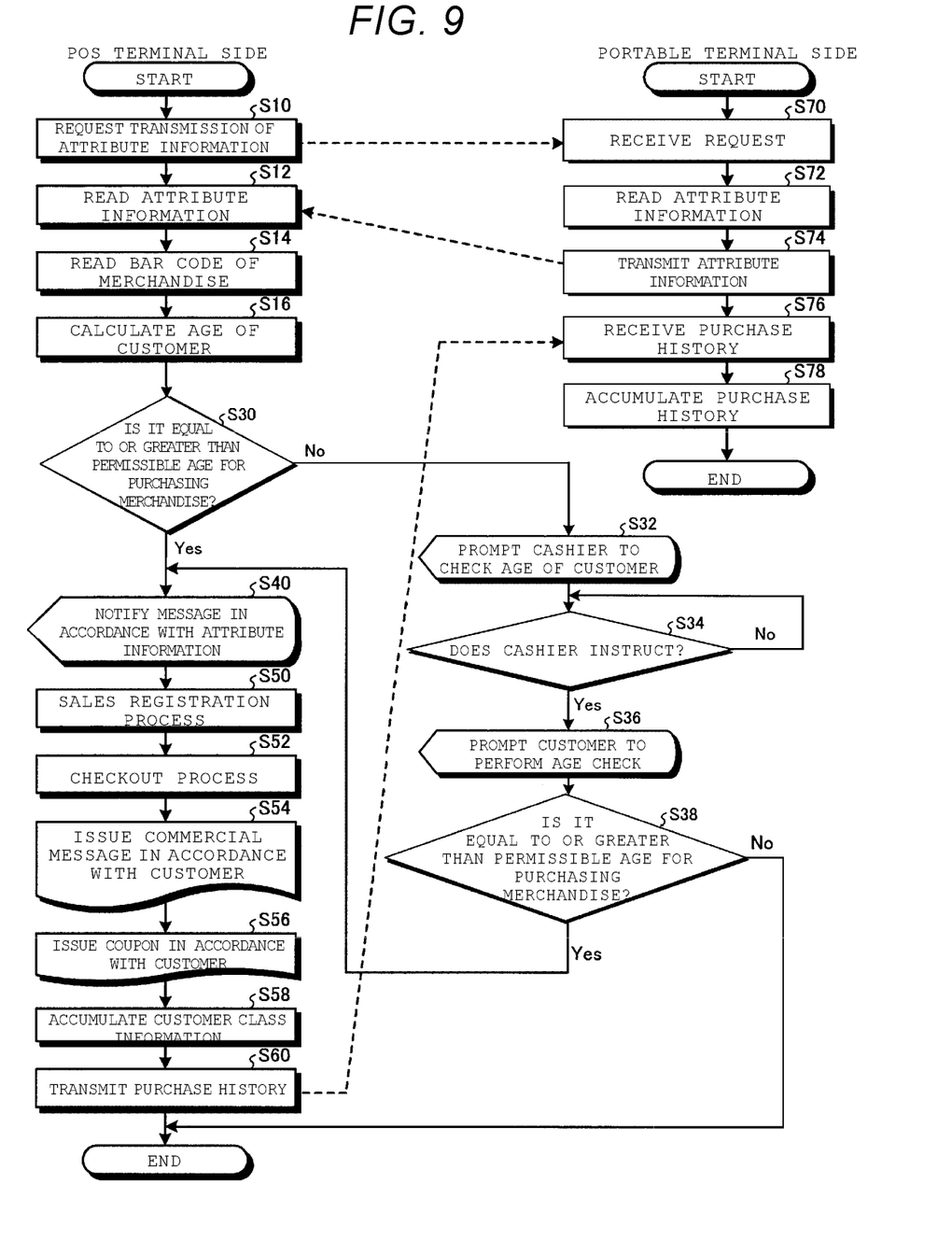
FIG. 9 is a flowchart illustrating a flow of a process performed by the merchandise sales data processing apparatus.

Next, an operation of the merchandise sales data processing apparatus 100*b* will be described with reference to FIG. 9. Only a process of step number not included in FIG. 6 among processes illustrated in FIG. 9 will be described. In the present embodiment, the POS terminal 10 receives the date of birth, the sex, and the merchandise purchase history from the portable terminal 60 as the attribute information of the customer C.

When an age of customer C is equal to or greater than the permissible age for purchasing the merchandise 98 (S30; Yes), or when the customer C declares that he/she is equal to or greater than the permissible age for purchasing merchandise (S38; Yes), the customer display 16 and the speaker 21 notify a message in accordance with the age of customer C, the sex, and the purchase history (S40).

After performing the checkout process (S52), the receipt issue unit 86 prints a commercial message in accordance with the customer C and issues the commercial message through the printer 17 (S54). In addition, the receipt issue unit 86 prints a coupon in accordance with the customer C and issues the coupon through the printer 17 (S56). By the process, for example, the coupon is issued with respect to the customer C of the birth month.

The purchase history accumulation unit 94 accumulates the date of birth of the customer C, the sex, and the purchase history to the customer class information (S58). Then, the sales registration processing unit 54 transmits the purchase history to the portable terminal 60 of the customer C through the wireless communication unit 51 (S60). After that, the process of the POS terminal 10 side is terminated.

The portable terminal 60 receives the purchase history of the current shopping from the POS terminal 10 (S76). The portable terminal 60 accumulates the received purchase history in the purchase history that is already stored (S78), and terminates the process of the portable terminal 60 side.

As described above, according to the merchandise sales data processing apparatus 100*b* of the second embodiment, when a date in which the checkout process is performed by the merchandise sales data processing unit 50 is the birth month of the customer C, the coupon issue unit 92 (information processing unit 80*b*) issues the coupon (reward). Accordingly, it is possible to perform sales marketing in accordance with the attribute information of the customer C.

In addition, according to the merchandise sales data processing apparatus 100*b* of the second embodiment, the customer class information including the date of birth, the sex, and the merchandise purchase history as the attribute information of the customer C is generated by accumulating the attribute information of the customer C (date of birth, sex, and purchase history) in the purchase history accumulation unit 94 (information processing unit 80b) when the merchandise sales data processing unit 50 performs the checkout process. Accordingly, by analyzing the accumulated customer class information of the store, it is possible to develop sales strategy of the store. In addition, since the purchase history is accumulated in not only the POS terminal 10 but also the portable terminal 60 of the customer C, it is possible for the customer C to store shopping history.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

An example of the related art includes JP-A-2013-3866.

What is claimed is:

1. A register system comprising:
an optical code reader;
a data storage;
a wireless communication interface through which the register system communicates wirelessly with a user computing device;
a display; and
a processor configured to
query a master record stored in the data storage to determine whether or not a product corresponding to a product code read by the optical code reader is a confirmation-required product,
responsive to determining that the product is a confirmation-required product, control the wireless communication interface to transmit a pull request for a user attribute stored in the user computing device, and
determine whether or not product registration processing for the confirmation-required product should continue with or without special processing based on the user attribute received by the wireless communication interface from the user computing device responsive to the pull request.

2. The register system according to claim 1, wherein the special processing is executed if the received user attribute is less than a threshold value, and includes a prompt that is displayed on the display.

3. The register system according to claim 1, further comprising:
a receipt printer, wherein
the processor is further configured to control the receipt printer to print a receipt containing transaction details of the product registration processing and content correlated with the user attribute.

4. The register system according to claim 1, wherein
the processor is further configured to generate an electronic receipt containing transaction details of the product registration processing and content correlated with the user attribute.

5. The register system according to claim 1, wherein
the processor is further configured to store the registered product code in association with the user attribute in the data storage.

6. The register system according to claim 1, wherein
the wireless communication interface employs near field communication (NFC).

7. The register system according to claim 1, wherein
the processor is further configured to display a product registration graphical user interface (GUI) for indicating registered product codes, and the prompt is overlaid on the product registration GUI.

8. A non-transitory computer readable medium comprising a program that is executable in a register system having a code reader and a wireless communication interface, to cause the register system to perform a method for carrying out product registration processing, the method comprising:
querying a master record stored in a data storage to determine whether or not a product corresponding to a product code read by the code reader is an confirmation-required product,
responsive to determining that the product is an confirmation-required product, control the wireless communication interface to transmit a pull request for a user attribute stored in a user computing device, and
determine whether or not product registration processing for the confirmation-required product should continue with or without special processing based on the user attribute received by the wireless communication interface from the user computing device responsive to the pull request.

9. The non-transitory computer readable medium of claim 8, wherein the special processing is executed if the received user attribute is less than a threshold value, and includes a prompt that is displayed on a display of the register system.

10. The non-transitory computer readable medium of claim 8, wherein the method further comprises:
controlling a receipt printer of the register system to print a receipt containing transaction details of the product registration processing and content correlated with the user attribute.

11. The non-transitory computer readable medium of claim 8, wherein the method further comprises:
generating an electronic receipt containing transaction details of the product registration processing and content correlated with the user attribute.

12. The non-transitory computer readable medium of claim 8, wherein the method further comprises:
storing the registered product code in association with the user attribute in the data storage.

13. The non-transitory computer readable medium of claim 8, wherein
the wireless communication interface employs near field communication (NFC).

14. The non-transitory computer readable medium of claim 8, wherein the method further comprises:
displaying a product registration graphical user interface (GUI) for indicating registered product codes, wherein the prompt is overlaid on the product registration GUI.

15. A method for processing product registration in a register system having a code reader and a wireless communication interface, said method comprising
querying a master record stored in a data storage to determine whether or not a product corresponding to a product code read by the code reader is an confirmation-required product,
responsive to determining that the product is an confirmation-required product, control the wireless communication interface to transmit a pull request for a user attribute stored in a user computing device, and
determine whether or not product registration processing for the confirmation-required product should continue with or without special processing based on the user attribute received by the wireless communication interface from the user computing device responsive to the pull request.

16. The method of claim 15, wherein the special processing is executed if the received user attribute is less than a threshold value, and includes a prompt that is displayed on a display of the register system.

17. The method of claim 15, further comprising:
controlling a receipt printer of the register system to print a receipt containing transaction details of the product registration processing and content correlated with the user attribute.

18. The method of claim 15, further comprising:
generating an electronic receipt containing transaction details of the product registration processing and content correlated with the user attribute.

19. The method of claim 15, further comprising:
storing the registered product code in association with the user attribute in the data storage.

20. The method of claim 15, further comprising:
displaying a product registration graphical user interface (GUI) for indicating registered product codes, wherein the prompt is overlaid on the product registration GUI.

* * * * *